US012736967B2

(12) United States Patent
Emmerich et al.

(10) Patent No.: US 12,736,967 B2
(45) Date of Patent: Sep. 15, 2026

(54) METHOD FOR CHANGING THE POSITION OF CARGO LOCATED ON A CARGO RECEPTACLE OF A DRIVERLESS TRANSPORT VEHICLE

(71) Applicant: Fraunhofer-Gesellschaft zur Foerderung der Angewandten Forschung E.V., Munich (DE)

(72) Inventors: Jan Soeren Emmerich, Munich (DE); Dirk Hoening, Munich (DE); Patrick Klokowski, Munich (DE); Christian Hammermeister, Munich (DE); Michael Ten Hompel, Munich (DE); Jan Behling, Munich (DE); Mathias Rotgeri, Munich (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 222 days.

(21) Appl. No.: 18/036,731

(22) PCT Filed: Oct. 18, 2021

(86) PCT No.: PCT/EP2021/078788
§ 371 (c)(1),
(2) Date: May 12, 2023

(87) PCT Pub. No.: WO2022/106130
PCT Pub. Date: May 27, 2022

(65) Prior Publication Data

US 2023/0409045 A1 Dec. 21, 2023

(30) Foreign Application Priority Data

Nov. 18, 2020 (DE) ..................... 10 2020 130 439.0

(51) Int. Cl.
*G05D 1/00* (2024.01)

(52) U.S. Cl.
CPC .................................. *G05D 1/0282* (2013.01)

(58) Field of Classification Search
CPC ... B60G 1/00; B60G 3/00; B60G 5/00; B60G 7/00; B60G 9/00; B60G 11/00;
(Continued)

(56) References Cited

U.S. PATENT DOCUMENTS 3,863,756 A * 2/1975 Conrad .................. B65G 27/12
198/768
6,324,447 B1 11/2001 Schramm et al.
(Continued)

FOREIGN PATENT DOCUMENTS

DE 198 27 881 A1 12/1999
DE 20 2020 000 762 U1 7/2020
EP 3 699 066 A1 8/2020

OTHER PUBLICATIONS

International Search Report in PCT/EP2021/078788, mailed Feb. 28, 2022.

*Primary Examiner* — Fadey S. Jabr
*Assistant Examiner* — Paula L Schneider
(74) *Attorney, Agent, or Firm* — Collard & Roe, P.C.

(57) ABSTRACT

In a method for changing the position of cargo located on a cargo receptacle of a driverless transport vehicle, the drive of the transport vehicle is controlled by a vehicle controller. The actual position of the cargo is detected by a detection device connected to the controller, and a cargo position correction vector to a cargo target position on the cargo receptacle is determined by the vehicle controller from the actual position of the cargo, and the vehicle controller controls the drive such that the transport vehicle is substantially accelerated in the opposite direction to the cargo position correction vector so that the cargo reaches the cargo target position on the cargo receptacle.

12 Claims, 7 Drawing Sheets

(58) Field of Classification Search

Figure 4:
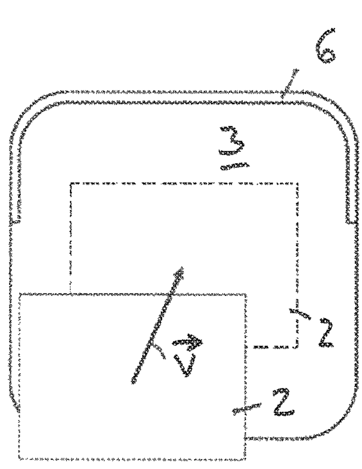

CPC ........ B60G 13/00; B60G 15/00; B60G 17/00; B60G 21/00; B60G 99/00; B60G 2200/00; B60G 2204/00; B60G 2206/00; B60G 2300/00; B60G 2400/00; B60G 2401/00; B60G 2500/00; B60G 2600/00; B60G 2800/00; B60G 2300/45; B60G 2400/10; B60G 2401/28; B60G 2600/182; B60G 2600/21; G05D 1/0282; G05D 1/0212; G05D 1/49; G05D 1/498; G05D 1/60; G05D 1/656; G05D 1/667; G05D 1/0223; G05D 1/43

USPC ........................................................... 701/49

See application file for complete search history.

(56) References Cited

U.S. PATENT DOCUMENTS

| | | | | |
|---|---|---|---|---|
| 2008/0055087 | A1* | 3/2008 | Horii | G09G 3/002 359/449 |
| 2011/0106362 | A1* | 5/2011 | Seitz | G05D 1/0214 701/24 |
| 2017/0083020 | A1* | 3/2017 | Purwin | G05D 1/0891 |
| 2020/0354171 | A1* | 11/2020 | Vincent | B65G 67/24 |
| 2021/0223779 | A1* | 7/2021 | Passot | G01C 21/20 |
| 2021/0354537 | A1* | 11/2021 | Kneifl | B62D 33/03 |
| 2022/0144034 | A1* | 5/2022 | Kim | H02K 7/102 |
| 2022/0144353 | A1* | 5/2022 | Enenkel | B62D 61/00 |
| 2022/0289505 | A1* | 9/2022 | Behling | B60P 1/52 |
| 2023/0039236 | A1* | 2/2023 | Hong | G06Q 10/083 |
| 2023/0315113 | A1* | 10/2023 | Kumagai | G05D 1/0223 701/25 |

* cited by examiner

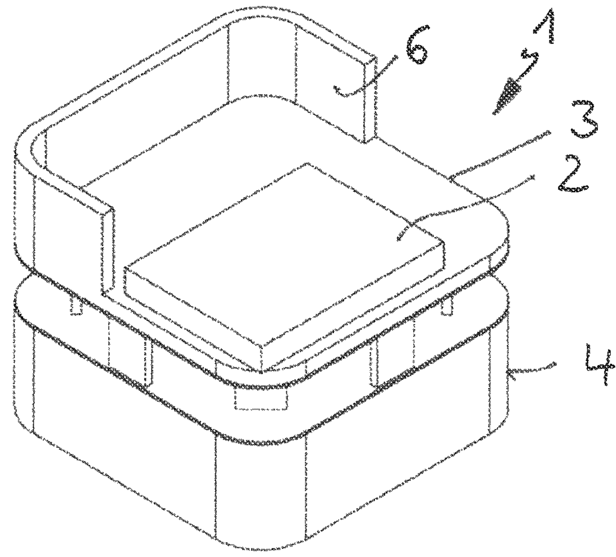
Fig. 1
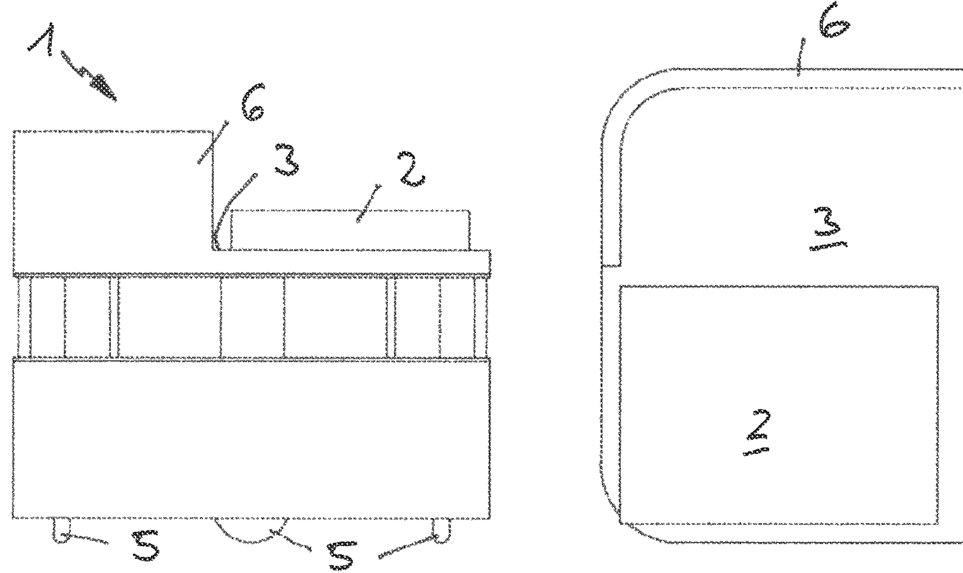
Fig. 2
Fig. 3

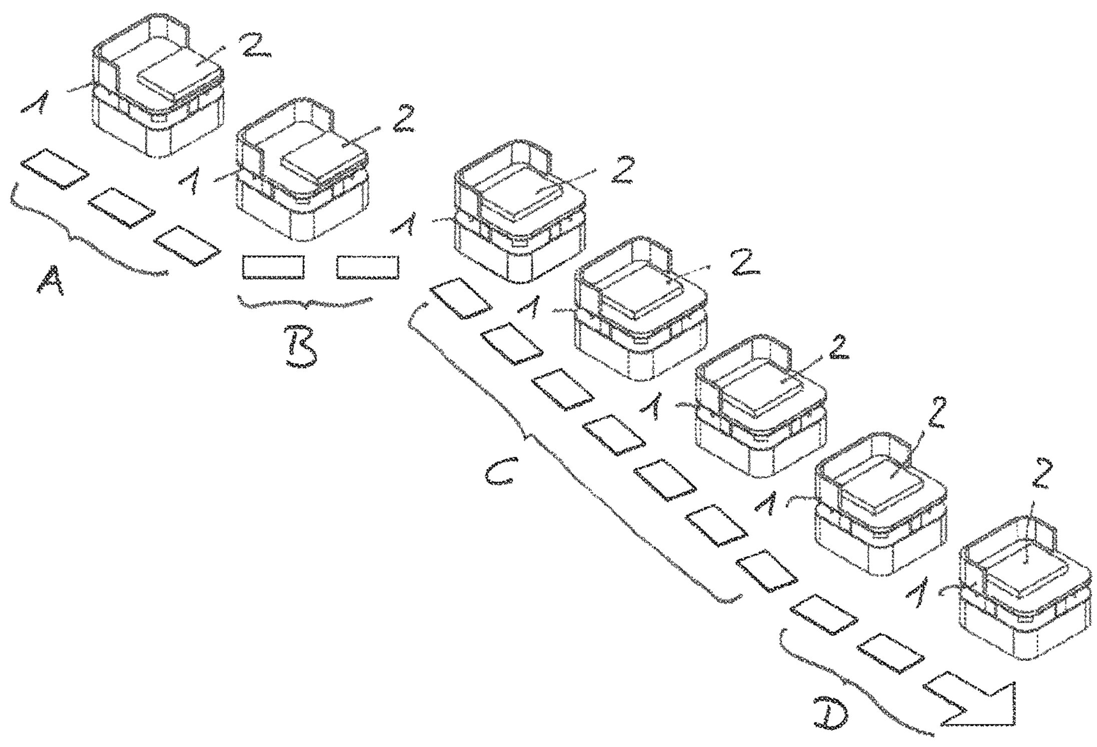
Fig. 8
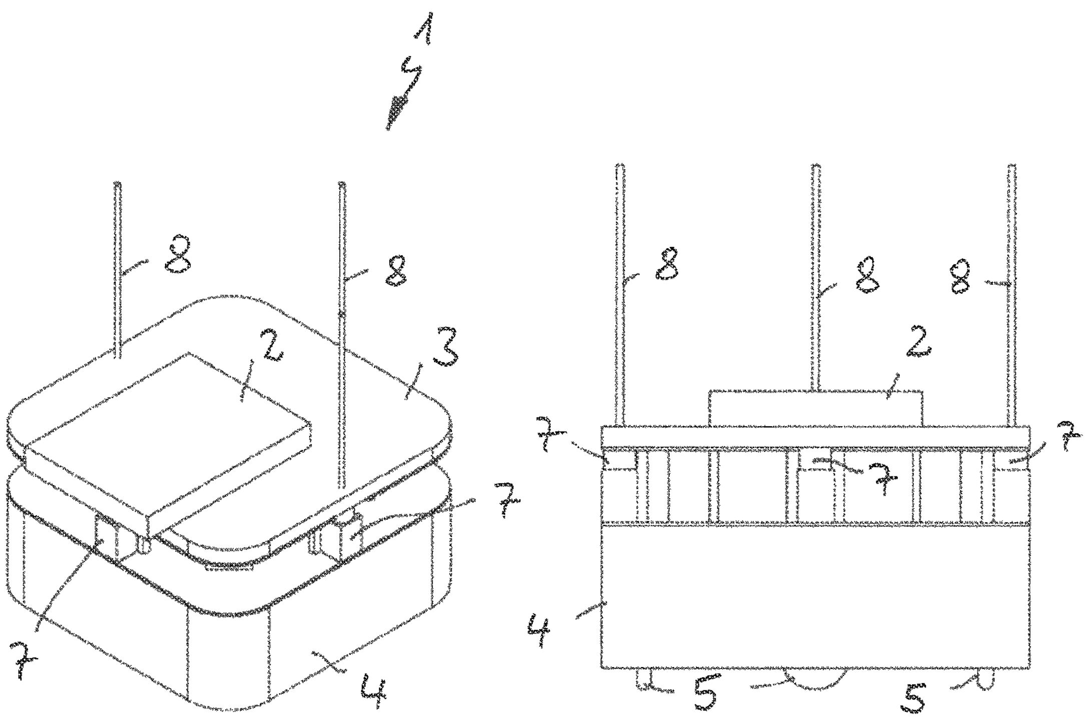
Fig. 9
Fig. 10

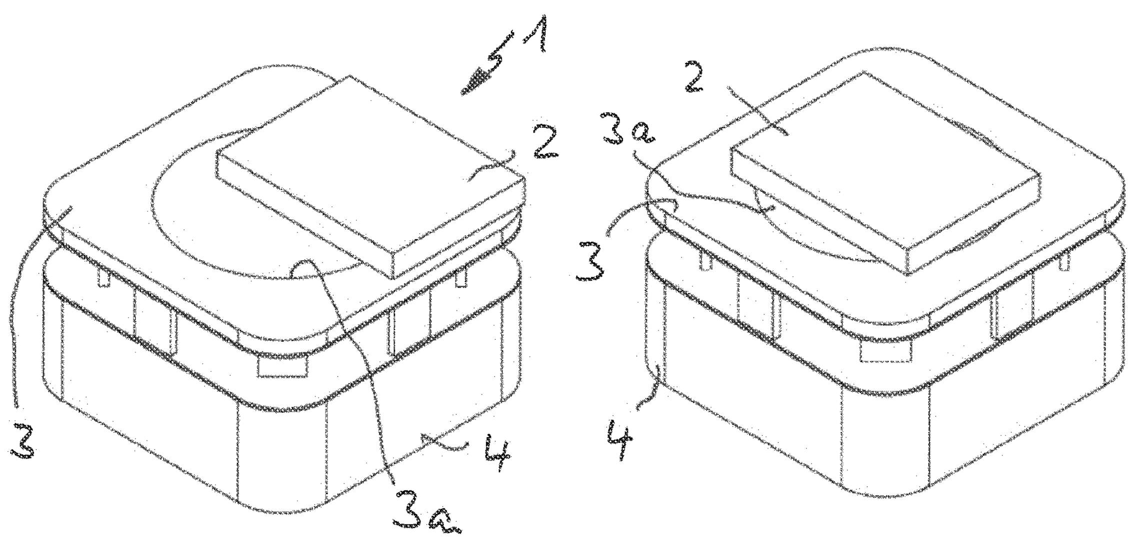
Fig. 14
Fig. 15
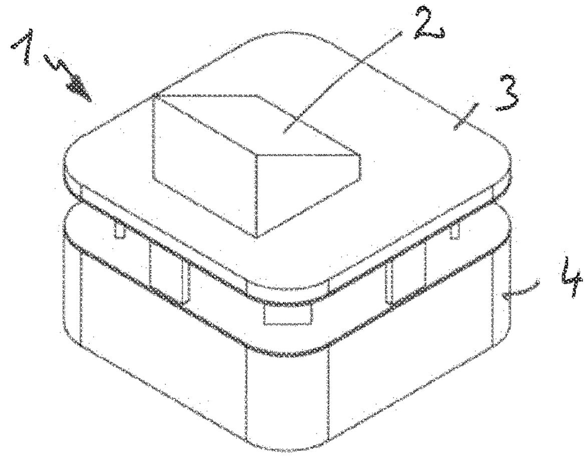
Fig. 16
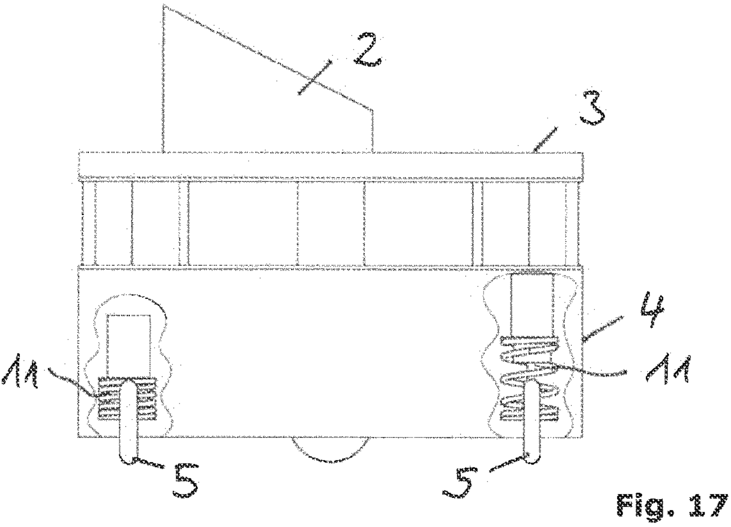
Fig. 17

13
T
1
2
12

13
T
2
V
12
1

1
T
13
2
12

1
2
T1
13
12

METHOD FOR CHANGING THE POSITION OF CARGO LOCATED ON A CARGO RECEPTACLE OF A DRIVERLESS TRANSPORT VEHICLE

CROSS REFERENCE TO RELATED APPLICATIONS

This application is the National Stage of PCT/EP2021/078788 filed on Oct. 18, 2021, which claims priority under 35 U.S.C. § 119 of German Application No. 10 2020 130 439.0 filed on Nov. 18, 2020, the disclosure of which is incorporated by reference. The international application under PCT article 21 (2) was not published in English.

The invention relates to a method for changing the position of cargo located on a cargo receptacle of a driverless transport vehicle, wherein the drive of the transport vehicle is controlled by a vehicle controller.

Driverless transport vehicles for transport of cargo are used in many cases, above all, in the sector of logistics. In this regard, automatic driverless transport vehicles are preferably used, which are controlled by a vehicle controller. For specific functions, such as unloading a cargo, preventing the cargo from falling down during braking, acceleration, traveling in a curve, interaction with other machines, precise positioning of the cargo in a predetermined cargo reference position of the cargo receptacle is important.

Positioning of the cargo on the cargo receptacle of a transport vehicle can be carried out in different ways. For example, the cargo can be positioned in a targeted manner, using a tool or robot. The cargo can also be fixed in place on the cargo receptacle, using shape-fit and/or force-fit elements. Also, active (e.g. pusher) or passive (e.g. stripper) elements can be used, which change the cargo position. Furthermore, the cargo can be transferred very precisely, by a constant conveyor, onto an element that is moving past it (e.g. a charging tray in the case of an automatic sorter for packages), at a coordinated speed.

If precise positioning of the cargo on the cargo receptacle of the transport vehicle cannot be produced, these imprecisions must be taken into consideration in the case of other subsections (e.g. detection of the cargo position before cargo transfer), and this is correspondingly complicated.

Methods for changing the position of cargo located on a cargo receptacle of a driverless transport vehicle are known from DE 20 2020 000 762 U1 and EP 3 699 066 A1.

It is the task of the invention to create a solution for driverless transport vehicles, in which the positioning of the cargo on the transport vehicle takes place by means of the transport vehicle itself, without additional positioning elements being required for this purpose on the transport vehicle or at the cargo transfer station.

This task is accomplished, in the case of a method of the type stated initially, according to the invention, in that the actual cargo position is detected by a detection device connected with the controller, and a cargo position correction vector to a target cargo position on the cargo receptacle is determined by the vehicle controller from the actual cargo position, and the vehicle controller controls the drive in such a manner that the transport vehicle is essentially accelerated in the direction opposite to the cargo position correction vector, so that the cargo reaches the target cargo position on the cargo receptacle.

Using such a method, it is possible to arrange a cargo on a cargo receptacle of a driverless transport vehicle in the desired target position, without additional positioning elements, in that by means of targeted one-time or multiple vehicle acceleration counter to the displacement direction from the actual position to the target position, the cargo slides into the target position on the cargo receptacle, after overcoming the friction force by means of the inertia force that is in effect. Depending on the circumstances, in each instance (e.g. required displacement path, friction), for this purpose a one-time short vehicle acceleration can already be sufficient. In many cases of use, completely precise positioning of the cargo is not required, but rather it is already sufficient if the cargo is not located in the edge region of the cargo receptacle and thereby in a target cargo region or partially projects outward beyond the cargo receptacle. In these cases, the demands on the measurement precision of the detection device are not very great; the actual cargo position then does not have to be detected precisely. Preferably, the transport vehicle has an omni-directional drive, with which sudden accelerations can be carried out in all directions, independent of the trajectory being traveled on at a particular moment—and thereby also counter to all required cargo position correction vectors.

In this regard, it can be provided that the actual cargo position is continuously detected by the detection device and taken into consideration by the vehicle controller. This way of managing the method is provided, above all, when multiple vehicle acceleration is required for cargo displacement.

It is advantageous if it is provided that before acceleration of the transport vehicle in a direction essentially opposite to the cargo position correction vector, the friction value of the surface of the cargo receptacle is changed. During normal travel of the vehicle, the contact surface of the cargo receptacle relative to the cargo is then set in such a manner that the cargo remains securely on the cargo receptacle. Before any vehicle acceleration for changing the position of the cargo, the friction value is reduced, so that the cargo can slide into the target position more easily. The vehicle acceleration can be correspondingly less, so that the transport vehicle deviates less from its actual travel route.

According to a first embodiment, it is provided that the detection device is arranged to be stationary and spatially separate from the transport vehicle. The detection device is then, of course arranged in the travel path of the transport vehicle, in such a manner that it can detect the cargo.

According to a second embodiment, it is provided that the detection device is connected with the transport vehicle.

The driverless transport vehicle can move in accordance with a predetermined trajectory. In this case, two method variants are possible.

According to a first variant, it is provided that the vehicle controller controls the drive in such a manner that the transport vehicle moves on a trajectory having predetermined target trajectory positions, from a starting trajectory point to a final trajectory point, and that during the movement of the vehicle on the trajectory, the acceleration of the transport vehicle for changing the position of the cargo is carried out, and thereby the actual vehicle position deviates from the target trajectory position, and that after completion of the acceleration of the transport vehicle, the vehicle controller re-determines the remaining trajectory to the final trajectory point, and controls the drive in such a manner that the transport vehicle moves along the newly determined trajectory.

Alternatively, it is provided, according to a second variant, that the vehicle controller controls the drive in such a manner that the transport vehicle moves on a trajectory having predetermined target trajectory positions, from a starting trajectory point to a final trajectory point, and that during the movement of the vehicle on the trajectory, the acceleration of the transport vehicle for changing the position of the cargo is carried out, and thereby the actual vehicle position deviates from the target trajectory position, and that after completion of the acceleration of the transport vehicle, the vehicle controller determines a relative vehicle position correction vector, which reduces the difference between the current actual vehicle position and the current target trajectory position and, at the same time, does not lead to a position change of the cargo, and controls the drive in such a manner that the transport vehicle approaches the target trajectory position, making use of the relative vehicle position correction vector that has been determined, and, after reduction of the difference between the actual vehicle position and the target trajectory position, continues to move on the trajectory.

The invention also relates to a driverless transport vehicle for carrying out the method, having a detection device connected with the transport vehicle, wherein the transport vehicle has a cargo receptacle that is arranged on a chassis having a drive, as well as a vehicle controller.

Above all if the actual cargo position is supposed to be or must be detected precisely, it is preferably provided that the detection device is a camera.

In this regard, it is advantageous if the camera is arranged below a transparent bottom region of the cargo receptacle. In addition, the camera can detect not only position information of the cargo but also optical identification characteristics of the cargo, such as bar codes or QR codes, for example.

Alternatively, it can also be provided that the detection device has light sensors that monitor the edge of a target cargo region on the cargo receptacle. This solution is above all considered when no precise position determination is required. For example, there can be a region on the cargo receptacle, within which cargo is allowed to be located. If it is lying there, no correction is required. If it is lying at least partially outside of the region, a correction is required. This is determined in that the outer edge of the region is monitored, at specific intervals, from below, through small holes, using light sensors. If at least one light sensor detects the cargo, a correction is required. The cargo position correction vector is then dependent on the number of sensors that acutely detect the cargo, as well as on their corresponding position.

As a variant, the transport vehicle can have a multiplicity of light sensors, once again from below, through holes in the cargo receptacle, in a defined pattern, for example a simple raster. It makes sense for the raster to be so tight that at least one sensor detects the cargo at all times. Depending on the sensor density (comparable to the resolution of a camera), the actual position of the cargo can be determined at any time, with varying precision, and also, in the case of a greater number of sensors, the approximate size of the cargo can also be determined.

It is also possible that the detection device is not configured to be optical, but rather is used to monitor the center of gravity position of the cargo, for example, in that a different deflection path of the suspension of the wheels of the transport vehicle is detected using suitable sensors. The detection device can also have ultrasound sensors or inductive sensors (for the detection of metallic cargo).

Furthermore, the invention also relates to a driverless transport system having at least one driverless transport vehicle, which has a cargo receptacle that is arranged on a chassis having a drive, and a vehicle controller, and having at least one detection device connected with the controller, which device is arranged to be stationary and spatially separate from the at least one transport vehicle. The at least one detection device is then preferably a camera.

Figure 5:
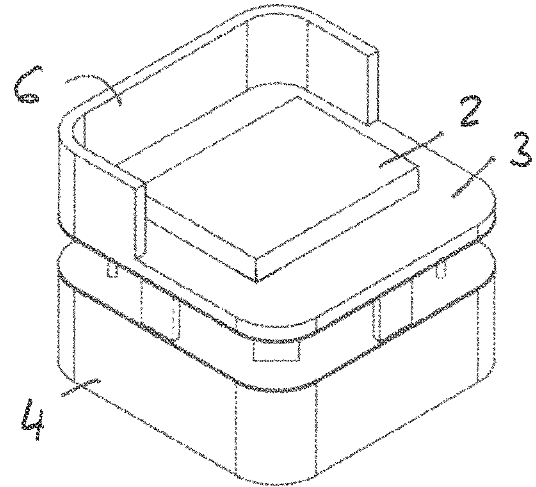
Figure 6:
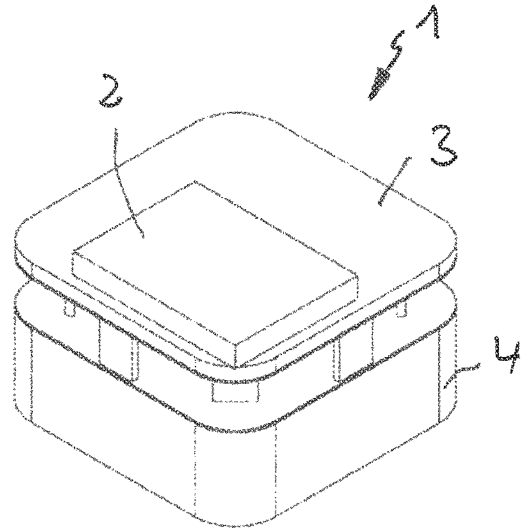
Figure 7:
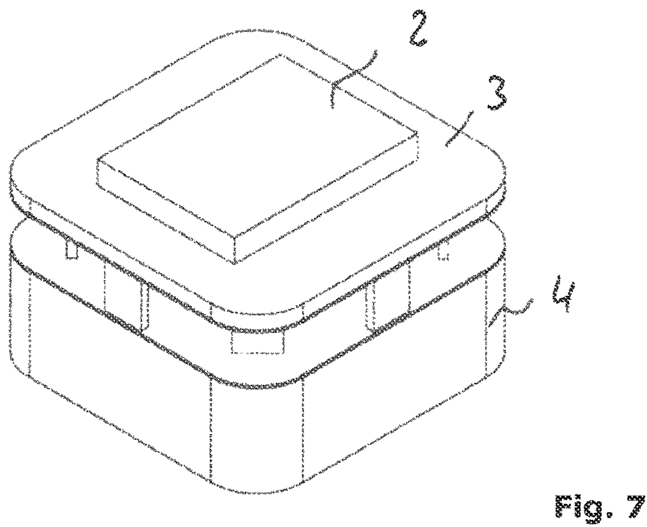
Figure 11:
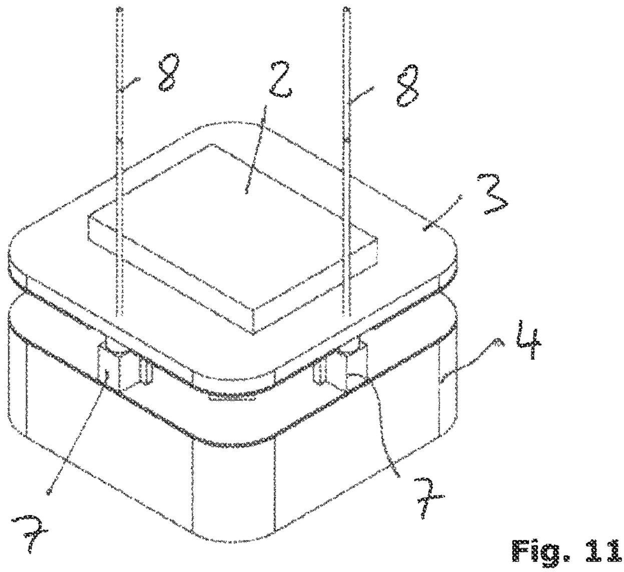
Figure 12:
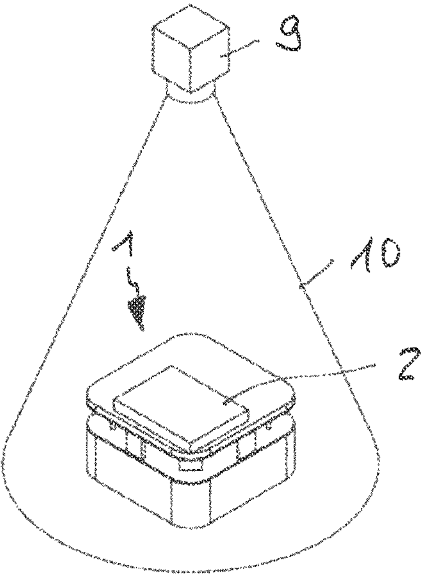
Figure 12:
Figure 13:
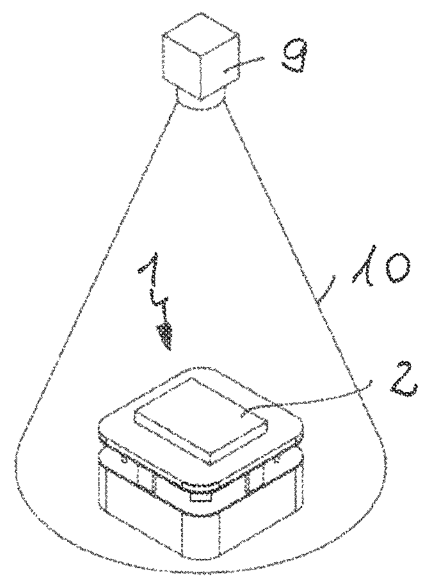
Figures 18, 19, 20, 21:
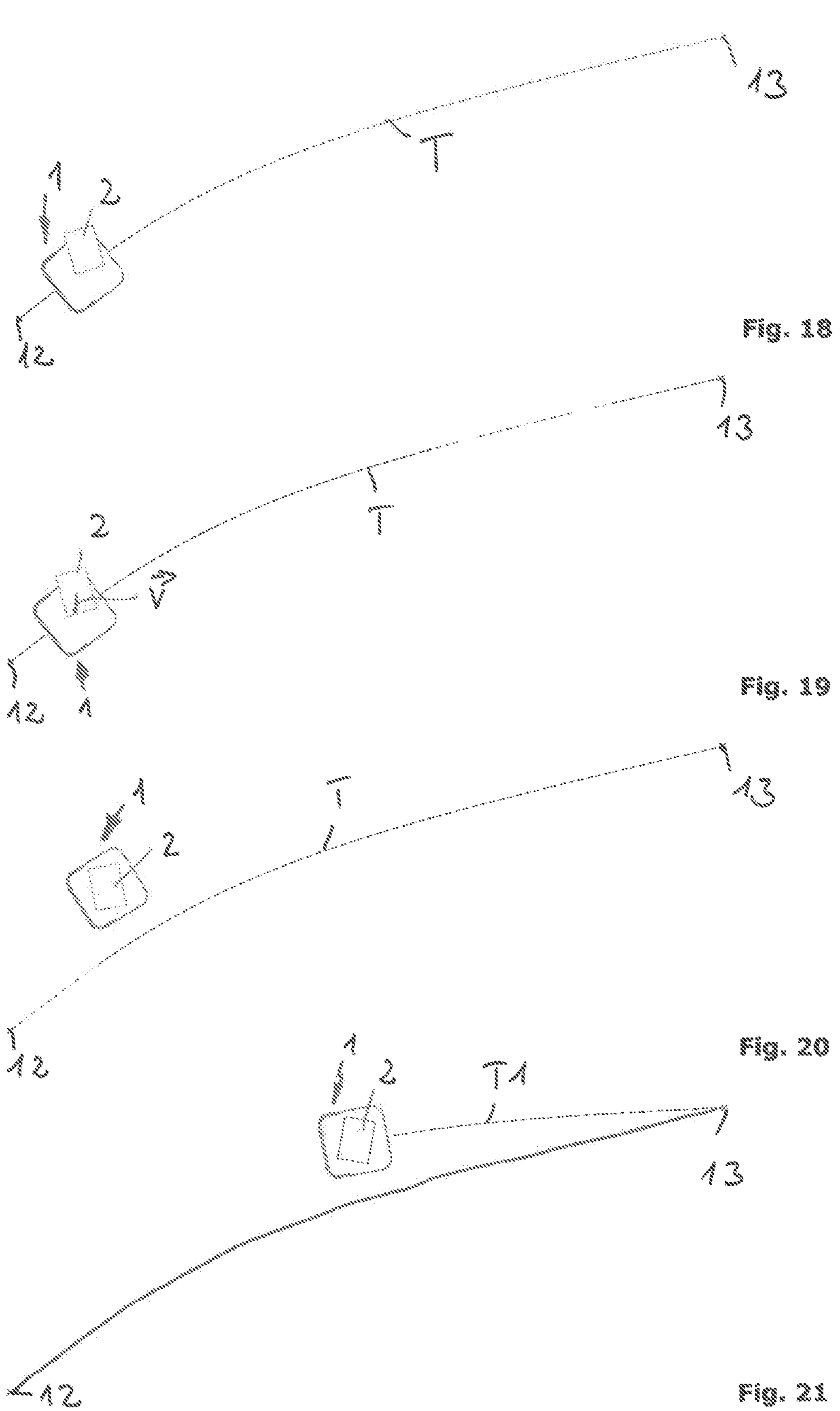
Figures 22, 23, 24:
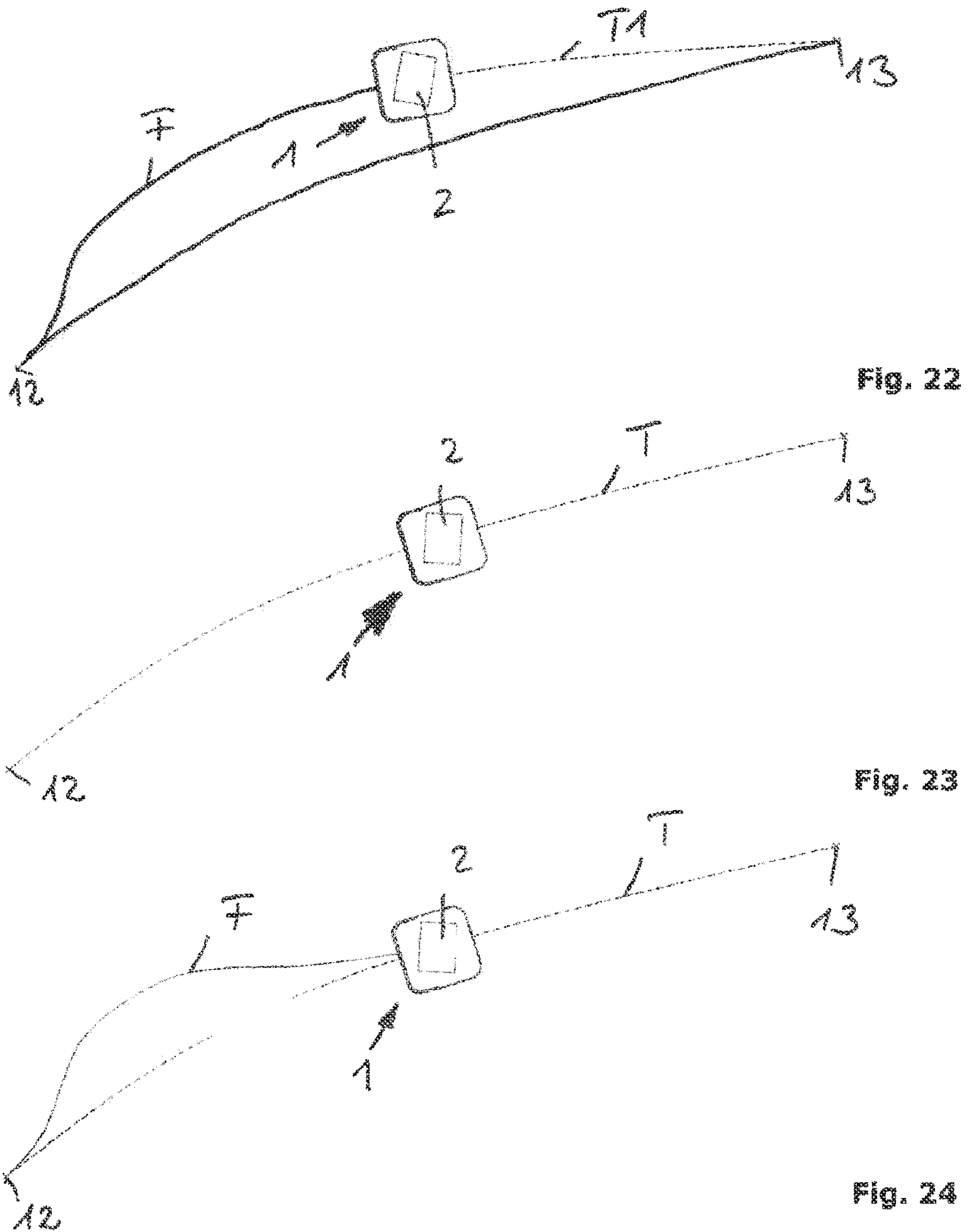

The invention will be explained in greater detail below, as an example, using the drawing. This shows, in:

FIG. 1 a schematic, perspective representation of a driverless transport vehicle suitable for carrying out the method, according to a first embodiment, FIG. 2 a side view of the transport vehicle according to FIG. 1, FIG. 3 a top view of the transport vehicle according to FIG. 1, with cargo, in an actual cargo position that deviates from the target cargo position, FIG. 4 a similar representation as in FIG. 3, with a cargo position correction vector, FIG. 5 a perspective representation of the transport vehicle according to FIG. 1, with cargo in the target cargo position, FIG. 6 a perspective representation of a transport vehicle according to a second embodiment, with cargo in an actual cargo position that deviates from the target cargo position, FIG. 7 the transport vehicle according to FIG. 6, with cargo in the target cargo position, FIG. 8 a schematic method sequence with a transport vehicle according to FIG. 1, FIG. 9 a perspective representation of a transport vehicle according to a third embodiment, with cargo, in an actual cargo position that deviates from the target cargo position, FIG. 10 a side view of FIG. 9, FIG. 11 the transport vehicle according to FIG. 9, with cargo in the actual cargo position, FIG. 12 a schematic, perspective representation of the transport vehicle according to FIG. 6, in the viewing field of an external camera as a detection device, FIG. 13 the transport vehicle according to FIG. 7 in the viewing field of the external camera, FIG. 14 a perspective, schematic representation of a transport vehicle according to a fourth embodiment, with cargo in an actual cargo position that deviates from the target cargo position, FIG. 15 the transport vehicle according to FIG. 14, with cargo in the target cargo position, FIG. 16 a perspective, schematic representation of a transport vehicle according to a fifth embodiment, FIG. 17 a side view of FIG. 16, FIG. 18 to 20 a movement sequence of a transport vehicle located on a predetermined trajectory, up to acceleration, FIG. 21 to 22 a movement sequence of the transport vehicle after acceleration, in a first method embodiment, and FIG. 23 to 24 a movement sequence of the transport vehicle after acceleration, in a second method embodiment.

A driverless transport vehicle for carrying out the method according to the invention is indicated in the figures as 1, in general. The transport vehicle 1 serves for transport of cargo, indicated in general as 2, and for this purpose has a planar cargo receptacle 3, on which the cargo 2 is located. The cargo receptacle 3 consists of metal or plastic, for example; its contact surface to the cargo 2 is flat in the exemplary embodiments. The transport vehicle 1 furthermore has a chassis, indicated in general as 4, on the underside of which rollers or wheels 5 are arranged.

In the exemplary embodiments shown, the cargo receptacle 3 is not arranged directly on the chassis 4, but rather an intermediate body is arranged between the top of the chassis 4 and the underside of the cargo receptacle 3. To secure the cargo 2 on the cargo receptacle 3 during transport, an edge delimitation 6 is provided on the transport vehicle according to FIG. 1 to 5, which delimitation extends only over a partial region of the circumference of the cargo receptacle 3, for example.

The transport vehicle 1 has a drive, not shown, which stands in a drive connection with the wheels or rollers 5, which drive can be controlled by a controller, not shown. The cargo 2 is located, in the representations of FIG. 1 to 3, in an actual cargo position that is located in a corner region of the cargo receptacle 3. This actual cargo position does not correspond to the desired target cargo position; this position of the cargo 2 is shown in FIG. 5.

Using the method according to the invention, for this reason the position of the cargo 2 is supposed to be changed from the actual cargo position according to FIG. 1 to 3 to the target cargo position according to FIG. 5. For this purpose, a detection device that will be described in greater detail below is provided, which device is connected with the controller of the driverless transport vehicle, and detects the actual cargo position of the cargo 2. After detection of the actual cargo position, the vehicle controller determines a cargo position correction vector $\vec{v}$ from the actual cargo position and the predetermined target cargo position. This cargo position correction vector is shown in FIG. 4; specifically, it extends from the center of gravity of the cargo 2 in the actual cargo position to the center of gravity of the cargo 2 in the target cargo position, indicated with a broken line.

After determination of the cargo position correction vector $\vec{v}$, the vehicle controller controls the drive of the transport vehicle in such a manner that the transport vehicle 1 is accelerated essentially in a direction opposite to the cargo position correction vector $\vec{v}$, in other words at a slant to the left downward in the sense of FIG. 4.

The movement sequence of the transport vehicle 1 is shown in FIG. 8. The transport vehicle 1 at first moves in a straight line, for example, in a region A, and then is accelerated opposite to the cargo position correction vector $\vec{v}$ in a region B, whereupon the cargo 2 slides into the target cargo position on the cargo receptacle 3, after overcoming the friction force by means of the inertia force. Subsequently, the transport vehicle 2 moves in the direction of the original transport path in a region C, so as to reach this path again in a region D.

In FIG. 6, a transport vehicle 1 is shown, which differs from the one according to FIG. 1 to 5 in that the cargo receptacle 3 does not have any edge delimitation. The cargo 2 is once again located in an actual cargo position that deviates from the target cargo position, and is moved into the target cargo position according to FIG. 7 in the manner described above, by means of one-time or multiple acceleration.

In FIG. 9 to 11, a transport vehicle 1 without edge delimitation is shown. On this transport vehicle 1, a detection device connected with the vehicle controller is provided, which has light sensors 7, for example. These light sensors 7 are arranged below the cargo receptacle 3 and can emit light beams 8 vertically upward through openings in the cargo receptacle 3. The light sensors 7 are arranged in such a manner that they monitor the edge of a target cargo region on the cargo receptacle 3. In FIG. 9, the cargo 2 is positioned in such a manner that the light beams of the front light sensor 7 impact the cargo 2, so that this light sensor recognizes that the cargo 2 is not located in the target cargo region and accordingly must be displaced on the cargo receptacle 3. FIG. 11 shows the cargo 2 in the target cargo position; all the light sensors 7 can emit light beams 8 without being hindered by the cargo 2, so that it is determined that the cargo 2 is located in the target cargo position.

In FIGS. 12 and 13, a driverless transport system for carrying out the method is shown, having a driverless transport vehicle 1 and a detection device connected with the controller and configured as a camera 9, which device is arranged to be stationary and spatially separate from the transport vehicle 1, for example above the travel path of the transport vehicle 1. The detection region of the camera 9 is represented by a cone 10, indicated schematically.

In FIGS. 14 and 15, a transport vehicle 1 is shown, into the cargo receptacle 3 of which a camera, not shown, is integrated as a detection device. This camera is arranged below a bottom region 3*a* of the cargo receptacle, which region is transparent at least in certain regions.

In FIGS. 16 and 17, a transport vehicle 1 is shown with a cargo 2 that is located in an actual cargo position that deviates from the target cargo position. In the case of this transport vehicle 1, wheels 5 having a suspension 11 are provided, wherein with reference to FIG. 17, the deflection path of the two suspensions 11 is different due to the arrangement of the cargo 2 outside of the target cargo position (center of gravity). In this case, the detection device has deflection path sensors, not shown, which are connected with the controller. If the controller detects that the deflection paths of the springs 11 are different, it can determine the center of gravity position of the cargo 2 from this and thereby the actual cargo position, and can initiate a change in position.

In FIG. 18 to 24, two method sequences are shown, during which the vehicle controller controls the drive of the transport vehicle 1 in such a manner that the transport vehicle 1 moves on a trajectory having predetermined target trajectory positions, from a starting trajectory point 12 to a final trajectory point 13 (FIG. 18).

In FIG. 18 to 20, the starting positions for both method sequences are shown; the transport vehicle 1 follows the trajectory T, shown with a broken line, the transport vehicle 1 is located in the target trajectory position, the cargo 2 in contrast is not located in the target cargo position.

The position of the cargo 2 must therefore be corrected in the sense of the cargo position correction vectors $\vec{v}$ according to FIG. 19.

To correct the cargo position to the actual cargo position, the transport vehicle 1 is now accelerated opposite to the cargo position correction vector $\vec{v}$, during the movement of the transport vehicle 1 on the trajectory T. Subsequently, the actual vehicle position deviates from the target trajectory position; this situation is shown in FIG. 20. In order for the transport vehicle 1 to reach the target point, in other words the final trajectory point 13, two different method sequences are provided, wherein the first method sequence is shown in Figs. 20 and 21.

After completion of the acceleration of the transport vehicle 1 (travel path F), the vehicle controller determines the remaining trajectory to the final trajectory point 13 again and controls the drive in such a manner that the transport vehicle 1 moves on a newly determined trajectory T1. The old trajectory is deactivated.

Alternatively, according to FIGS. 23 and 24, it is provided that after completion of the acceleration of the transport vehicle 1, the vehicle controller determines a relative vehicle position correction vector, which reduces the difference between the current actual vehicle position and the current target trajectory position and, at the same time, does not lead to a change in position of the cargo, and controls the drive in such a manner that the transport vehicle approaches the target trajectory position, making use of the relative vehicle position correction vector that has been determined and, after reduction of the difference between the actual vehicle position and the target trajectory position, continues to move on the (original) trajectory T. In this case, a new trajectory is therefore not determined; the vehicle continues to move on the original trajectory T until it reaches the final trajectory point 13.

REFERENCE SYMBOL LIST

1 transport vehicle
2 cargo
3 cargo receptacle
3*a* transparent bottom region
4 chassis
5 wheels
6 edge delimitation
7 light sensor
8 light beam
9 camera
10 cone
11 suspension
12 starting trajectory point
13 final trajectory point
T, T1 trajectory
$\vec{v}$ cargo position correction vector
A region
B region
C region
D region
F travel path

The invention claimed is:

1. A method for changing the position of cargo located on a cargo receptacle of a driverless transport vehicle, the method comprising:
providing the transport vehicle with an omni-directional drive, with which accelerations can be carried out in all directions,
detecting the actual cargo position by a detection device connected with a vehicle controller,
determining a cargo position correction vector to a target cargo position on the cargo receptacle with the vehicle controller from the actual cargo position, and
controlling the omni-directional drive with the vehicle controller in such a manner that the transport vehicle is essentially accelerated in the direction opposite to the cargo position correction vector, so that the cargo reaches the target cargo position on the cargo receptacle, wherein the cargo slides into the target cargo position on the cargo receptacle by means of inertial force.

2. The method according to claim 1, wherein the actual cargo position is continuously detected by the detection device and taken into consideration by the vehicle controller.

3. The method according to claim 1, further comprising: before acceleration of the transport vehicle in a direction essentially opposite to the cargo position correction vector, changing the friction value of the surface of the cargo receptacle.

4. The method according to claim 1, further comprising: arranging the detection device to be stationary and spatially separate from the transport vehicle.

5. The method according to claim 1, further comprising: connecting the detection device with the transport vehicle.

6. The method according to claim 1,
wherein the vehicle controller controls the omni-directional drive in such a manner that the transport vehicle moves on a trajectory having predetermined target trajectory positions, from a starting trajectory point to a final trajectory point, and
wherein during the movement of the vehicle on the trajectory, the acceleration of the transport vehicle for changing the position of the cargo is carried out, and thereby the actual vehicle position deviates from the target trajectory position, and
wherein after completion of the acceleration of the transport vehicle, the vehicle controller re-determines the remaining trajectory to the final trajectory point, and controls the omni-directional drive in such a manner that the transport vehicle moves along the newly determined trajectory.

7. The method according to claim 1,
wherein the vehicle controller controls the omni-directional drive in such a manner that the transport vehicle moves on a trajectory having predetermined target trajectory positions, from a starting trajectory point to a final trajectory point, and
wherein during the movement of the transport vehicle on the trajectory, the acceleration of the transport vehicle for changing the position of the cargo is carried out, and thereby the actual vehicle position deviates from the target trajectory position, and
wherein after completion of the acceleration of the transport vehicle, the vehicle controller determines a relative vehicle position correction vector that reduces the difference between the current actual vehicle position and the current target trajectory position and, at the same time, does not lead to a change in position of the cargo, and controls the omni-directional drive in such a manner that the transport vehicle approaches the target trajectory position, making use of the determined relative vehicle position correction vector, and continues to move on the trajectory after reduction of the difference between the actual vehicle position and the target trajectory position.

8. A driverless transport vehicle comprising:
a cargo receptacle, which is arranged on a chassis having an omni-directional drive, with which accelerations can be carried out in all directions, and having a vehicle controller, and
a detection device connected with the vehicle controller,
wherein the detection device is configured to detect an actual cargo position of cargo located on the cargo receptacle,
wherein the vehicle controller is configured to determine a cargo position correction vector to a target cargo position on the cargo receptacle from the actual cargo position, and to control the omni-directional drive in such a manner that the transport vehicle is essentially accelerated in the direction opposite to the cargo position correction vector, so that the cargo reaches the target cargo position on the cargo receptacle, and
wherein the cargo slides into the target cargo position on the cargo receptacle by means of inertial force.

9. The transport vehicle according to claim 8, wherein the detection device is a camera.

10. The transport vehicle according to claim 9, wherein the camera is arranged below a transparent bottom region of the cargo receptacle.

11. The transport vehicle according to claim 8, wherein the detection device has light sensors that monitor the edge of a target cargo region on the cargo receptacle.

12. A driverless transport system comprising:

at least one driverless transport vehicle comprising:

a cargo receptacle that is arranged on a chassis having an omni-directional drive, with which accelerations can be carried out in all directions, and having a vehicle controller, and at least one detection device connected with the vehicle controller and arranged to be stationary and spatially separate from the at least one transport vehicle, wherein the at least one detection device is configured to detect an actual cargo position of cargo located on the cargo receptacle, wherein the vehicle controller is configured to determine a cargo position correction vector to a target cargo position on the cargo receptacle from the actual cargo position, and to control the omni-directional drive in such a manner that the at least one transport vehicle is essentially accelerated in the direction opposite to the cargo position correction vector, so that the cargo reaches the target cargo position on the cargo receptacle, and wherein the cargo slides into the target cargo position on the cargo receptacle by means of inertial force.

* * * * *